United States Patent [19]

Ohya et al.

[11] Patent Number: 5,670,231
[45] Date of Patent: Sep. 23, 1997

[54] CLUTCH FACING

[75] Inventors: Kazuyuki Ohya; Norio Sayama, both of Tokyo, Japan

[73] Assignee: Mitsubishi Gas Chemical Company, Inc., Tokyo, Japan

[21] Appl. No.: 137,919

[22] Filed: Oct. 19, 1993

[30] Foreign Application Priority Data

Oct. 23, 1992 [JP] Japan ................... 4-286213

[51] Int. Cl.⁶ ...................... C08J 5/14
[52] U.S. Cl. .............. 428/66.2; 428/299.4; 428/300.1; 428/300.4; 428/297.4; 523/152; 523/155; 523/157
[58] Field of Search ................... 523/152, 155, 523/157; 428/374, 401, 297.4, 299.4, 300.1, 300.4, 66.2

[56] References Cited

U.S. PATENT DOCUMENTS

| | | | |
|---|---|---|---|
| 4,558,115 | 12/1985 | Hefner. | |
| 4,944,373 | 7/1990 | Ohya et al. | 188/251 A |
| 5,106,887 | 4/1992 | Horiguchi | 523/155 |
| 5,411,773 | 5/1995 | Ohya et al. | 428/1 |

FOREIGN PATENT DOCUMENTS

| | | | |
|---|---|---|---|
| 0183335 | 6/1986 | European Pat. Off.. | |
| 0344778 | 12/1989 | European Pat. Off.. | |
| 0516273 | 12/1992 | European Pat. Off.. | |
| 60-031585 | 2/1985 | Japan. | |
| 3074642 | 3/1991 | Japan | 523/151 |
| 329377 | 6/1994 | Japan. | |

OTHER PUBLICATIONS

Tungalloy; *Wet Friction Member,* Derwent Publications Ltd; 13 Nov. 1986.

Kunio; *Resin Composition For Friction Material,* Derwent Publications Ltd; 18 Feb. 1985.

*Primary Examiner*—Marion E. McCamish
*Assistant Examiner*—Elizabeth M. Cole
*Attorney, Agent, or Firm*—Browdy and Neimark

[57] ABSTRACT

An asbestos-free high performance clutch facing which exhibits a less decrease in the friction coefficient as well as a less wearing during long-term repeated cycles of loading at high temperatures is disclosed.

The clutch facing is a disk-shaped clutch facing produced by molding a composition for a friction material with heating and under pressure, the composition comprising:

15–50 parts by weight of (I) a binder composition comprising 95–30% by weight of (a) an aromatic hydrocarbon-formaldehyde resin-modified novolak type epoxy resin, and 5–70% by weight of a cyanate ester resin consisting essentially of (b) a polyfunctional cyanate ester, or a prepolymer of the cyanate ester, or (b) and (c) a monofunctional or polyfunctional maleimide;

20–70 parts by weight of (II) a fibrous reinforcing substrate with a fiber diameter of 0.2 μm or more;

2–20 parts by weight of (III) a metallic fiber substrate with a fiber diameter of 10 μm or more; and 5–40 parts by weight of (IV) a friction wear regulator.

17 Claims, No Drawings

CLUTCH FACING

FIELD OF THE INVENTION

The present invention relates to a clutch facing. More particularly, the invention relates to an asbestos-free high performance clutch facing which exhibits a less decrease in the friction coefficient as well as a less wearing during long-term repeated cycles of loading at high temperatures.

BACKGROUND OF THE INVENTION

Clutch facings have so far been produced from materials comprising asbestos, rubber and phenolic resins. Since asbestos was found to be carcinogenic, however, those free from asbestos have been desired.

Automobiles have certain requirements for performance and design, such as a high power, compact engine, and improved fuel efficiency, and thus require a high performance and compactness of units such as brake and clutch. For example, a clutch facing must be operable at 250°–300° C., temperatures higher than the maximum temperature encountered during usual use. From the aspect of safety, moreover, its frictional characteristics must not deteriorate, but last long at such elevated temperatures.

However, conventional asbestos/phenolic resin-based materials have not fulfilled the above requirements for high performance.

Proposals made as a solution have been to use, instead of asbestos, a fibrous reinforcing substrate comprising any suitable combinations of totally aromatic polyamide fibers (aramide fibers), glass fibers, rock wool, carbon fibers, graphite fibers, ceramic fibers, steel fibers, copper fibers, and brass fibers. These materials have provided improved wear resistance, but have still been unsatisfactory in stability of frictional coefficient at high temperatures.

For example, a clutch facing, which is produced by using glass fibers, aramide fibers, or a mixture of these fibers as a reinforcing substrate, adhering a phenolic resin, and if desired, rubber, a curing agent, or a curing accelerator, to the reinforcing substrate, preforming the resulting system, and heating the preformed product under pressure, has a good friction coefficient of 0.3–0.4 at a temperature of less than 250° C. At a temperature of 250° C. or higher, its friction coefficient sharply lowers to 0.25 or lower, thus causing fade and increasing wear. If the degree of vulcanization of rubber is raised as an anti-fade measure intended to increase heat resistance, judder is apt to occur with a smell.

Inorganic or metallic friction materials are used, in place of organic friction materials, in fields where heat resistance is indispensable. They are mainly copper-based sintered alloys with high wear resistance. However, they are too heavy to satisfy the light weight requirement, and are poor in clutch-in properties and feeling. These drawbacks hampered their use in ordinary cars.

SUMMARY OF THE INVENTION

The object of the present invention is to provide a clutch facing which maintains a stable friction coefficient (normally 0.3–0.5) during repeated cycles of loading at higher temperatures above 250° C. which has a less wear, which does not warp when integrated with a clutch disk, and which involves little smoke or smell generation at high temperatures because of minimal addition of rubber or sulfide.

The present invention relates to a disk-shaped clutch facing produced by molding a composition for a friction material with heating under pressure, the composition comprising:

15–50 parts by weight of (I) a binder composition comprising 95–30% by weight of (a) an aromatic hydrocarbon-formaldehyde resin-modified novolak type epoxy resin, and 5–70% by weight of a cyanate ester resin consisting essentially of (b) a polyfunctional cyanate ester, or a prepolymer of the cyanate ester, or (b) and (c) a monofunctional or polyfunctional maleimide;

20–70 parts by weight of (II) a fibrous reinforcing substrate with a fiber diameter of 0.2 μm or more;

2–20 parts by weight of (III) a metallic fiber substrate with a fiber diameter of 10 μm or more; and 5–40 parts by weight of (IV) a friction wear regulator.

DESCRIPTION OF THE PREFERRED EMBODIMENTS

In preferred embodiments of the present invention, the proportion of the binder composition (I) is 20–40 parts by weight;

the proportion of the aromatic hydrocarbon-formaldehyde resin-modified novolak type epoxy resin (a) in the binder composition (I) is 80–50% by weight, and the remainder of the binder composition (I) is therefore 20–50% by weight;

the fibrous reinforcing substrate (II) consists mainly of glass fibers;

the metallic fiber substrate (III) consists mainly of copper fibers or brass fibers; and the friction wear regulator (IV) is one agent or a mixture of two or more agents selected from the group consisting of BT resin dust, short aramide fibers, barium sulfate, carbon, graphite, calcium carbonate, molybdenum disulfide, and potassium titanate.

The present invention also relates to a clutch facing produced by impregnating or adhering the binder composition (I) and the friction wear regulator (IV) into or onto a yarn comprising the fibrous reinforcing substrate (II), integrating a yarn comprising the metallic fiber substrate (III) with the above yarn to form a preform yarn, arranging the preform yarn as such, or if desired after cutting, into the form of a disk, and molding the arranged preform yarn with heating under pressure; wherein the fibrous reinforcing substrate (II) has been surface treated with the aromatic hydrocarbon-formaldehyde resin-modified novolak type epoxy resin (a), the cyanate ester resin (b) or NBR-modified epoxy resin.

The construction of the present invention will be described below.

The binder composition (I) of the present invention plays the role of a binder which firmly binds the components (II) to (IV) together to impart the desired friction wear characteristics.

The binder composition (I) comprises 95–30% by weight of (a) an aromatic hydrocarbon-formaldehyde resin-modified novolak type epoxy resin, and 5–70% by weight of a cyanate ester resin consisting essentially of (b) a polyfunctional cyanate ester, or a prepolymer of the cyanate ester, or (b) and (c) a monofunctional or polyfunctional maleimide.

The aromatic hydrocarbon-formaldehyde resin-modified novolak type epoxy resin, component (a), is obtained by reacting an aromatic hydrocarbon-formaldehyde resin, a phenol, and formaldehyde to obtain an aromatic hydrocarbon-formaldehyde resin-modified novolak, and reacting its hydroxyl group with epichlorohydrin for epoxidation.

The starting aromatic hydrocarbon-formaldehyde resin is prepared using one or more of mesitylene, xylene, toluene, benzene, naphthalene, methylnaphthalene, dimethylnaphthalene and other aromatic hydrocarbons. Examples of the resin are mesitylene-formaldehyde resin, xylene-formaldehyde resin, toluene-formaldehyde resin, benzene-formaldehyde resin, and naphthalene-formaldehyde resin. Examples of the phenol are phenol, cresol, xylenol, resorcinol and bisphenol A. The formaldehyde may come from any substance which produces formaldehyde under reaction conditions. For the reaction for obtaining the epoxy resin, a method using epichlorohydrin is the easiest and preferred method.

The aromatic hydrocarbon-formaldehyde resin-modified novolak can be produced by reacting the above-mentioned aromatic hydrocarbon-formaldehyde resin with the phenol in the presence of an acid catalyst such as an inorganic acid (e.g. sulfuric acid, hydrochloric acid or nitric acid), toluenesulfonic acid, xylenesulfonic acid or oxalic acid, an organic acid metal salt such as calcium acetate, magnesium acetate or zinc acetate, or a neutral catalyst such as zinc oxide, and then further reacting the product with formaldehyde. That novolak is also producible by reacting the phenol with formaldehyde, and then reacting the product with the aromatic hydrocarbon-formaldehyde resin; or by reacting the aromatic hydrocarbon-formaldehyde resin, the phenol and formaldehyde at the same time. Hexamethylenetetramine usually used as a curing agent should preferably not be used.

The ratio of the aromatic hydrocarbon-formaldehyde resin to the phenol is preferably such an amount as to be nearly equal to the equivalent of the reactive group for phenol which is normally used in the aromatic hydrocarbon-formaldehyde resin. Examples of the reactive group are oxygen-containing groups such as —$CH_2$—OH, —$CH_2$—O—$CH_2$—, —$CH_2$—O—, and —$CH_2$—O—$CH_2$—OH. If the amount of the phenol is too small, gelation or the like will occur in part of the reaction product, thus causing increased viscosity, and the unreacted compounds left due to the interruption of the reaction. If its amount is too large, the friction coefficient at high temperatures of 300° C. will become unstable. Formaldehyde is also in such an amount that the novolak-forming reaction will take place.

For instance, when xylene-formaldehyde resin with a number-average molecular weight of 350–800 and an oxygen content of 8–17% by weight is reacted with phenol, the ratio of xylene-formaldehyde resin to phenol is 100:100–250 (weight ratio), preferably 100:100–200. The aromatic hydrocarbon-formaldehyde resin modified novolak obtained by this method is normally a brown solid with a melting point of 60°–120° C.

The phenolic hydroxyl group in the aromatic hydrocarbon-formaldehyde resin-modified novolak is reacted with epichlorohydrin for epoxidation, to obtain an aromatic hydrocarbon-formaldehyde resin-modified novolak epoxy resin. The reaction can be performed in a known manner, and the resulting epoxy resin usually has a melting point of 45° C.

Next, the cyanate ester resin consists essentially of (b) a polyfunctional cyanate ester or a prepolymer of the cyanate ester, and uses (c) a monofunctional or polyfunctional maleimide or a prepolymer of the maleimide in order to impart heat resistance. The proportion of the component (b) in the cyanate ester resin is preferably 30–60% by weight. Epoxy resin may also be incorporated in a small amount to improve workability. Its amount is normally 30% or less, preferably 2–10% by weight, based on the resin component.

Cyanato resins from (b) are made known to public by Japanese Patent Publication Nos. Sho 41-1928, Sho 45-11712 and Sho 44-1222, German Patent No. 1190184, and U.S. Pat. Nos. 4,026,913, 4,022,755, 3,448,079, 3,553,244, 3,755,402, 3,740,348, 3,595,900, 3,694,410 and 4,116,946. Cyanate ester-maleimide resins, cyanate ester-maleimide-epoxy resins, and cyanate ester-epoxy resins corresponding to (b)+(c) are known publicly from Japanese Patent Publication Nos. Sho 54-30440, Sho 52-31279 and Sho 46-41112 and U.S. Pat. No. 4,110,364.

Examples of the polyfunctional cyanate ester are 1,3- or 1,4-dicyanatobenzene, 1,3,5-tricyanatobenzene, 1,3-, 1,4-, 1,6-, 1,8-, 2,6- or 2,7-dicyanatonaphthalene, 1,3,6-tricyanatonaphthalene, 4,4'-dicyanatobiphenyl, bis(4-cyanatophenyl)methane, 2,2-bis(4-cyanatophenyl)propane, 2,2-bis(3,5-dichloro-4-cyanatophenyl)propane, 2,2-bis(3,5-dibromo-4-cyanatophenyl)propane, bis(4-cyanatophenyl)ether, bis(4-cyanatophenyl)thioether, bis(4-cyanatophenyl)sulfone, tris(4-cyanatophenyl)phosphite, tris(4-cyanatophenyl)phosphate, cyanate esters prepared by reacting hydroxy-terminated polycarbonate oligomers with a cyanogen halide (U.S. Pat. No. 4,026,913), and cyanate esters prepared by reacting novolak with a cyanogen halide (U.S. Pat. No. 4,022,755 and U.S. Pat. No. 3,448,079).

The fibrous reinforcing substrate (II) with a fiber diameter of 0.2 μm or more used in the present invention is inorganic or heat-resistant organic fibers. Specific examples include glass fibers, rock wool fibers, ceramic fibers, carbon fibers, graphite fibers, phenolic fibers (novoloid fibers), potassium titanate fibers, wholly aromatic polyamide fibers and fibrillated pulp (aramide fibers, nomex fibers, aramide fibrillated pulp), poly(phenylenesulfide) fibers, poly(ether ether ketone) fibers, polyetherimide fibers, and liquid crystal polyester fibers and fibrillated pulp. Normally, those with a fiber diameter of 100 μm or less are used, and other components are impregnated into or applied to them as fiber yarns. In the present invention, the fibrous reinforcing substrate (II) preferably uses glass fibers, aramide fibers or a mixture of glass fibers and aramide fibers as a major component. These fibrous reinforcing substrate (II) may be surface treated with a silane coupling agent, a titanate coupling agent or the like.

Examples of the metallic fiber substrate (III) with a fiber diameter of 10 μm or more used in the present invention are copper fibers, copper alloy fibers such as brass fibers, steel fibers, aluminum fibers, and zinc fibers. These metallic fibers may be long fibers shaped like a thin wire, or there can preferably be used spindle-shaped fibers made by cutting, e.g. vibration cutting, which are relatively short, which are generally thicker at the center and thinner at both ends, and which have uneven patterns on the surface. Usually, those with a fiber diameter of 250 μm or less can be cited. The clutch facing of the present invention requires a high burst strength because a great centrifugal force is imposed thereon. In addition to improving burst strength, the metallic fiber substrate cleans the surface of the clutch plate opposite to it, and improves friction characteristics such as the wear resistance of the clutch facing surface. Besides, the metallic fiber substrate improves heat conductivity, as well as promotes cyclization or carbonization of resins, such as binder or low-temperature friction improver, at high temperatures, thus making liquefaction difficult.

The friction wear regulator (IV) of the present invention is a component for maintaining a constant friction coefficient and a less wear in the low to high temperature ranges. Normally, an organic low-temperature friction material, a high-temperature lubricant and a high-temperature friction wear regulator are jointly used. Examples of the organic low-temperature friction materials are rubber dust, cashew dust, melamine dust and BT resin dust (a material prepared by curing aromatic hydrocarbon-formaldehyde resin-modified novolak epoxy resin and cyanate ester-maleimide resin, followed by pulverizing the product), and aramide fibers. Examples of the high-temperature lubricant are graphite, molybdenum disulfide, lead sulfide, potassium titanate, phthalocyanine, copper phthalocyanine, talc, calcium difluoride, fluoroplastics, barium sulfate and calcium carbonate. Examples of the high-temperature friction wear regulator are alumina, silica, mullite, cyalon, alumina-zirconia fibers, and alumina fibers.

In the present invention, the cured product of the binder composition (I), when heated at high temperatures, is carbonized and decomposed without undergoing liquefaction, but still exhibits the properties of the organic low-temperature friction material. Thus, the use of the high-temperature lubricant usually suffices.

The clutch facing of the present invention is produced using the above-mentioned components as the essential components, but may further comprise any known curing catalysts for the component (I), auxiliaries for molding, and so on. Preferred curing catalysts for the component (I) include, for example, organometallic salts, organometallic chelate compounds, inorganic metal salts, organic peroxides, aliphatic or aromatic amines, imidazole, and phenol novolak. Examples of the organometallic salts and organometallic chelate compounds include zinc naphthenate, lead stearate, zinc octylate, tin oleate, dibutyltin maleate, manganese naphthenate, cobalt naphthenate, iron acetylacetonate, and manganese acetylacetonate. Examples of the organic peroxides include benzoyl peroxide, lauroyl peroxide, capryl peroxide, acetyl peroxide, p-chlorobenzoyl peroxide, and di-tert-butyl-di-perphthalate. These curing catalysts are sufficiently used in amounts within the ordinary ranges, for example, in amounts of 0.01 to 5% by weight each.

The above-described components (I) to (IV), and if desired the catalyst for the component (I), are used to prepare the clutch facing of the present invention.

The proportions of the components are 15–50 parts by weight for the component (I), 20–70 parts by weight for the component (II), 2–20 parts by weight for the component (III), and 5–40 parts by weight for the component (IV). The preferred proportions are 20–40 parts by weight for the component (I), 30–65 parts by weight for the component (II), and 5–25 parts by weight for the component (IV). If the proportion of the component (I) is less than 15 parts by weight, it will become difficult to maintain the strength of the friction wear regulator, especially the inorganic material. If it exceeds 50 parts by weight, there will be an insufficient strength, and there will result insufficient friction wear properties. If the proportion of the component (II) is less than 20 parts by weight, there will be lack of strength. If it exceeds 70 parts by weight, the product will become hard, and its friction wear properties will be ill balanced with its other properties. If the proportion of the component (III) is less than 2 parts by weight, surface cleaning performance will be poor. If it exceeds 20 parts by weight, there will be great opposite surface attacking properties. The proportion of the component (IV) less than 5 parts by weight will lead to an ill balance of friction wear properties with other characteristics. That proportion more than 25 parts by weight will result in an insufficient strength.

The components described above are placed in a mold for the desired disk-shaped clutch facing. They are molded with heating and under pressure, and if desired finished, to obtain the clutch facing of the present invention.

The method of placing these components in the mold is not restricted, as long as they can be uniformly placed in the mold. Because of the ease of placement and for the sake of burst strength, however, it is preferred to use a preform yarn obtained by impregnating or adhering the binder composition (I) and the friction wear regulator (IV) to a yarn comprising the fibrous reinforcing substrate (II), and then integrating a yarn comprising the metallic fiber substrate (III) with the so treated yarn. If the resulting preform yarn is to be used as such, a preferred method would be spiral weaving which is widely used. Another feasible method would be to cut the preform yarn to less than several centimeters, and then arrange the cut product in the form of a disk.

In preparing the preform yarn, it is preferred to surface treat the fibrous reinforcing substrate (II) or the metallic fiber substrate (III) with the cyanate ester resin (a) in advance. The preform yarn is hot pressed at a temperature of 150°–200° C., preferably 170°–190° C., and a pressure of 1–1,000 kgf/cm$^2$, preferably 20–300 kgf/cm$^2$, to cure the component (I), thereby producing a molded product. If a higher resistance to heat is required, the product is further heated treated at a temperature of 200°–300° C., preferably 210°–240° C. to obtain the clutch facing of the present invention.

The clutch facing obtained above is surface-polished, and if desired, subjected to finishing of the contour. Then, it is usually glued, bolted or riveted to a metal substrate for a clutch, to make a clutch.

EXAMPLES

The present invention will be described in detail by reference to Examples, in which parts and % are on a weight basis unless otherwise indicated.

Example 1

One hundred parts of xylene-formaldehyde resin (Nicanol H, Mitsubishi Gas Chemical Co., Inc.; number-average molecular weight 460–500, oxygen content 10–11%) and 120 parts of phenol were reacted for 2 hours at 130° C. using 0.1 part of p-toluenesulfonic acid as a catalyst. Then, 1 part of zinc oxide and 40 parts of 37% formalin were added, and the mixture was reacted for 3 hours at 100° C. Then, the reaction mixture was dehydrated under reduced pressure with heating. When the temperature reached 150° C., dehydration under reduced pressure was completed to obtain a xylene resin-modified novolak-phenol resin having a melting point of 90° C.

One hundred parts of the resulting xylene resin-modified novolak-phenol resin and 13 parts of solid sodium hydroxide were dissolved in 130 parts of water, and the solution was heated to 50° C. with vigorous stirring. Thirty-two parts of epichlorohydrin was added to the solution with stirring, and the mixture was held at 80° C. with stirring for reaction in a uniformly mixed state. After the reaction was completed, the excess epichlorohydrin was removed under reduced pressure. Then, benzene was added, and the reaction mixture was washed to remove water. Pure water was added again, and the reaction system was washed to remove water. This procedure was repeated for purification. Then, the system was distilled under reduced pressure to remove benzene, thereby obtaining a xylene resin-modified novolak-epoxy resin having a melting point of 80° C. (hereinafter called the resin I).

A strand with an apparent diameter of 3 mm comprising a bundle of E-glass monofilaments with a diameter of 6 μm was bulked, and brass fibers with a diameter of 0.2 mm were woven into the bulked strand to obtain a bulky conjugate yarn.

The bulky conjugate yarn was impregnated with a 10% methyl ethyl ketone solution of cyanate ester-maleimide resin comprising 2,2-bis(4-cyanatophenyl)propane and N,N'-bismaleimide phenylmethane (95:5) (hereinafter called BT-2060B). Then, the yarn was dried for 30 minutes at 120° C. to obtain a pre-impregnated yarn.

Seventy parts of the resin I obtained above, 30 parts of cyanato resin [2,2-bis(4-cyanatophenyl)propane, BT-2000], and 0.1 part of 2-ethyl-4-methylimidazole as a catalyst were kneaded, followed by kneading barium sulfate, carbon, and aramide fibrils into the system. A small amount of methyl ethyl ketone was added to adjust the viscosity of the mixture. The aforementioned pre-impregnated yarn was dipped into the resulting solution, and dried for 10 minutes at 140° C. to form a preform yarn with a binder composition gelling time of about 50 seconds (at 170° C.) and an apparent diameter of 4 mm.

The resulting preform yarn was arranged in the form of a disk in a mold by spiral weaving, and preformed under pressure. Then, the preform was molded for 15 minutes at a temperature of 165° C. and a pressure of 200 kgf/cm$^2$.

The resulting molded product was withdrawn from the mold, and stepwise heated (165° C./1 hr, 240° C./6 hr) in a heating oven. Both frictional surfaces of the treated product were ground to obtain a disk-shaped clutch facing.

The resulting clutch facing contained 35 parts of glass fibers, 12 parts of the BT-2060B, 24 parts of the resin I/cyanato resin, 10 parts of barium sulfate, 10 parts of carbon, 5 parts of aramide fibrils, and 4 parts of brass fibers.

The resulting clutch facing was tested, and the results shown in Table 1 were obtained.

Comparative Example 1

A strand with an apparent diameter of 3 mm comprising a bundle of E-glass monofilaments with a diameter of 6 μm was bulked. The strand was dipped in a 15% methanol solution of melamine modified phenolic resin, and then dried for 1 hour at 120° C.

Separately, SBR was dissolved in toluene, and a solution of melamine modified phenolic resin was added to form a highly viscous solution with a viscosity of 10,000–20,000 cps. A rubber crosslinking agent comprising sulfur, zinc oxide and a curing accelerator (CZ), as well as barium sulfate, carbon and cashew dust were kneaded into it. The resulting solution was applied to the above-mentioned bulked strand, and brass fibers were wrapped about it. Then, the strand was fully air dried to obtain a preform yarn.

The resulting preform yarn was arranged in the form of a disk in a mold, and preformed under pressure. Then, the preform was molded for 5 minutes at a temperature of 165° C. and a pressure of 200 kgf/cm$^2$.

The resulting molded product was withdrawn from the mold, and treated in the same manner as in Example 1 except that it was heat treated for 8 hours at 200° C. in a heating oven. A disk-shaped clutch facing was obtained.

The resulting clutch facing contained 40 parts of glass fibers, 12 parts of melamine modified phenolic resin, 14 parts of SBR, 10 parts of barium sulfate, 10 parts of carbon, 7 parts of the crosslinking agent, 3 parts of cashew dust, and 4 parts of brass fibers.

The resulting clutch facing was tested, and the results shown in Table 1 were obtained.

Example 2

One hundred parts of naphthalene-formaldehyde resin and 100 parts of phenol were reacted for 2 hours at 140° C. using 0.1 parts of p-toluenesulfonic acid as a catalyst. Then, 1 part of oxalic acid and 35 parts of 37% formalin were added, and the mixture was reacted for 2.5 hours at 100° C. Then, the reaction mixture was dehydrated under reduced pressure with heating. When the temperature reached 165° C., dehydration under reduced pressure was completed to obtain a naphthalene resin modified novolak-phenolic resin having a melting point of 125° C.

Reaction and purification were performed in accordance with the same procedure as in Example 1, except that the naphthalene resin modified novolak-phenolic resin obtained above was used. A naphthalene resin modified novolak-epoxy resin having a melting point of 102° C. (hereinafter called the resin II) was obtained.

A strand with an apparent diameter of 3 mm comprising a bundle of E-glass monofilaments with a diameter of 6 μm was bulked, and brass fibers with a diameter of 0.2 mm were woven into the bulked strand to obtain a bulky conjugate yarn.

The bulky conjugate yarn was impregnated with a 10% methyl ethyl ketone solution of cyanato resin. Then, the yarn was dried for 30 minutes at 120° C. to obtain a pre-impregnated yarn.

Seventy parts of the resin II obtained above, 30 parts of cyanato resin, and 0.1 part of 2-ethyl-4-methylimidazole were kneaded, followed by kneading barium sulfate, carbon, and aramide fibrils. Methyl ethyl ketone was added to adjust the viscosity of the mixture. The aforementioned pre-impregnated yarn was dipped into the resulting solution, and dried for 15 minutes at 140° C. to form a preform yarn with a binder composition gelling time of about 62 seconds (at 170° C.) and an apparent diameter of 4 mm.

The resulting preform yarn was arranged in the form of a disk in a mold, and preformed under pressure. Then, the preform was molded for 5 minutes at a temperature of 165° C. and a pressure of 200 kgf/cm$^2$.

The resulting molded product was withdrawn from the mold, and stepwise heated (170° C./1 hr, 240° C./8 hr) in a heating oven. Both frictional surfaces of the treated product were ground to obtain a disk-shaped clutch facing.

The resulting clutch facing contained 35 parts of glass fibers, 12 parts of cyanato resin, 24 parts of the resin II, 10 parts of barium sulfate, 10 parts of carbon, 5 parts of aramide fibrils, and 4 parts of brass fibers.

The resulting clutch facing was tested, and the results shown in Table 1 were obtained.

Example 3

A strand with an apparent diameter of 3 mm comprising a bundle of aramide fibers was bulked, and impregnated with a 10% methyl ethyl ketone solution of NBR modified epoxy resin (POLYDIS PD3614, Storktol). Then, the strand was dried for 30 minutes at 120° C. to obtain a pre-impregnated strand.

Seventy parts of the aforementioned resin I, 30 parts of BT-2060B (solids), and 0.2 part of 2-undecyl-imidazolenitrile (=C$_{11}$Z—CN) were kneaded, followed by kneading barium sulfate, carbon, and BT resin dust (a 20–100 mesh powder comprising a cured product of xylene resin modified novolak-epoxy resin/resin=7:3). Then, a small amount of methyl ethyl ketone was added to adjust the viscosity.

The resulting solution was applied or adhered to the above-mentioned pre-impregnated strand, and a copper wire was wrapped about its yarn. The yarn was then dried for 20 minutes at 140° C. to form a preform yarn.

The resulting preform yarn was arranged in the form of a disk in a mold, and preformed under pressure. Then, the preform was molded for 15 minutes at a temperature of 180° C. and a pressure of 200 kgf/cm².

The resulting molded product was withdrawn from the mold, and stepwise heated (150° C./1 hr, 240° C./6 hr) in a heating oven. Both frictional surfaces of the treated product were ground to obtain a disk-shaped clutch facing.

The resulting clutch facing contained 35 parts of aramide fibers, 24 parts of resin I/BT-2060B (solids), 8 parts of NBR modified epoxy resin, 10 parts of barium sulfate, 10 parts of carbon, 4 parts of BT resin dust, and 8 parts of copper fibers.

The resulting clutch facing was tested, and the results shown in Table 1 were obtained.

The testing methods complied with the wear performance test of the JIS-D-4311 (clutch facing for automobiles) which measures friction coefficient and wear rate.

TABLE 1

| Measuring temp. (°C.) | Friction coefficient (μ) | | | | | | | Wear rate (*1) |
|---|---|---|---|---|---|---|---|---|
|  | 50 | 100 | 150 | 200 | 250 | 300 | 350 | 300 |
| Ex. 1 | 0.45 | 0.44 | 0.44 | 0.43 | 0.42 | 0.41 | 0.39 | 1.8 |
| Comp. Ex. 1 | 0.43 | 0.42 | 0.40 | 0.36 | 0.27 | 0.19 | 0.04 | 10.3 |
| Ex. 2 | 0.43 | 0.42 | 0.43 | 0.42 | 0.40 | 0.38 | 0.40 | 1.5 |
| Ex. 3 | 0.46 | 0.45 | 0.43 | 0.41 | 0.39 | 0.38 | 0.34 | 2.2 |

*1: ×10⁻¹ cm²/kgf/m

As will be obvious from the above detailed description of the invention and the Examples, the clutch facing of the present invention maintains a stable friction coefficient at elevated temperatures above 250° C., and has a low wear rate. Thus, it is of paramount industrial significance as an asbestos-free high performance clutch facing.

What is claimed is:

1. A disk-shaped clutch facing produced by molding a composition for a friction material with heating and under pressure, the composition comprising:
   15–50 parts by weight of (I) a binder composition comprising 95–30% by weight of (a) an aromatic hydrocarbon-formaldehyde resin-modified novolak based epoxy resin, and 5–70% by weight of a cyanate ester resin consisting essentially of (b) a polyfunctional cyanate ester, or a prepolymer of the cyanate ester, or (b) and (c) a monofunctional or polyfunctional maleimide;
   20–70 parts by weight of (II) a fibrous reinforcing substrate with a fiber diameter of 0.2 to 100 μm;
   2–20 parts by weight of (III) a metallic fiber substrate with a fiber diameter of 10 to 250 μm; and
   5–40 parts by weight of (IV) a friction wear regulator.

2. The clutch facing of claim 1 wherein the proportion of the binder composition (I) is 20–40 parts by weight.

3. The clutch facing of claim 1 wherein the proportion of the aromatic hydrocarbon-formaldehyde resin-modified novolak type epoxy resin (a) in the binder composition (I) is 80–50% by weight.

4. The clutch facing of claim 1 wherein the fibrous reinforcing substrate (II) consists essentially of glass fibers and totally aromatic polyamide fibers.

5. The clutch facing of claim 1 wherein the metallic fiber substrate (III) consists essentially of copper fibers or brass fibers.

6. The clutch facing of claim 1 wherein the friction wear regulator (IV) is one agent or a mixture of two or more agents selected from the group consisting of BT resin dust, short aramide fibers, barium sulfate, carbon, graphite, calcium carbonate, molybdenum disulfide, and potassium titanate.

7. The clutch facing of claim 1 produced by impregnating or adhering the binder composition (I) and the friction wear regulator (IV) into or onto a yarn comprising the fibrous reinforcing substrate (II), integrating a yarn comprising the metallic fiber substrate (III) with the above yarn to form a preform yarn, arranging the preform yarn as such, or if desired after cutting, into the form of a disk, and molding the arranged preform yarn with heating under pressure.

8. The clutch facing of claim 7 wherein the fibrous reinforcing substrate (II) has been surface treated with the aromatic hydrocarbon-formaldehyde resin-modified novolak type epoxy resin (a), the cyanate ester resin (b) or NBR-modified epoxy resin.

9. A clutch facing according to claim 1 wherein said aromatic hydrocarbon-formaldehyde resin-modified novolak based epoxy resin is a product of reaction between (1) epichlorohydrin and (2) a reaction product of (i) an aromatic hydrocarbon-formaldehyde resin, (ii) a phenol, and (iii) formaldehyde.

10. The clutch facing of claim 9 wherein the proportion of the binder composition (I) is 20–40 parts by weight.

11. The clutch facing of claim 10 wherein the proportion of the aromatic hydrocarbon-formaldehyde resin-modified novolak based epoxy resin (a) in the binder composition (I) is 80–50% by weight.

12. The clutch facing of claim 11 wherein the friction wear regulator (IV) is one agent or a mixture of two or more agents selected from the group consisting of BT resin dust, short aramide fibers, barium sulfate, carbon, graphite, calcium carbonate, molybdenum disulfide, and potassium titanate.

13. A clutch facing according to claim 12, wherein said fibrous reinforcing substrate (II) is selected from the group consisting of glass fibers, totally aromatic polyamide fibers, and mixtures thereof.

14. A clutch facing according to claim 13, wherein said aromatic hydrocarbon of said aromatic hydrocarbon-formaldehyde resin-modified novolak epoxy resin is selected from the group consisting of mesitylene, xylene, toluene, benzene, naphthalene, methylnaphthalene and dimethylnaphthalene.

15. A clutch facing consisting essentially of:
   (I) a binder matrix in an amount of 20–40 parts by weight and comprising a reaction product of (a) 80–50% by weight of an aromatic hydrocarbon formaldehyde resin-modified novolak epoxy resin which is an epichlorohydrin epoxidated reaction product of (i) an aromatic hydrocarbon-formaldehyde resin, (ii) a phenol, and (iii) formaldehyde, and (b) 20–50% by weight of a cyanate ester resin consisting essentially of a polyfunctional cyanate ester, a prepolymer of said cyanate ester, or a mixture of a monofunctional or polyfunctional maleimide together with said polyfunctional cyanate ester or prepolymer thereof;
   (II) 20–70 parts by weight of a fibrous reinforcing material with a fiber diameter of 0.2 μm to 100 μm;
   (III) 2–20 parts by weight of a metallic fiber material with a fiber diameter of 10 μm to 250 μm; and
   (IV) 5–40 parts by weight of a friction wear regulator.

16. A clutch facing according to claim 15, wherein said fibrous reinforcing substrate (II) is selected from the group consisting of glass fibers, totally aromatic polyamide fibers, and mixtures thereof.

17. A clutch facing according to claim 15, wherein said aromatic hydrocarbon of said aromatic hydrocarbon-formaldehyde resin-modified novolak epoxy resin is selected from the group consisting of mesitylene, xylene, toluene, benzene, naphthalene, methylnaphthalane and dimethylnaphthalene.

* * * * *